US008726632B2

(12) United States Patent
Morford et al.

(10) Patent No.: US 8,726,632 B2
(45) Date of Patent: May 20, 2014

(54) GAS TURBINE ENGINE HAVING SLIM-LINE NACELLE

(75) Inventors: Stephen A. Morford, Marlborough, CT (US); Michael J. Larkin, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 985 days.

(21) Appl. No.: 12/832,280

(22) Filed: Jul. 8, 2010

(65) Prior Publication Data

US 2010/0269486 A1 Oct. 28, 2010

Related U.S. Application Data

(62) Division of application No. 11/584,030, filed on Oct. 20, 2006, now Pat. No. 7,797,944.

(51) Int. Cl.
*B63H 11/00* (2006.01)

(52) U.S. Cl.
USPC .............................................. 60/204; 60/771

(58) Field of Classification Search
USPC .................. 60/226.1, 230, 771, 772, 204; 239/265.33, 265.37, 265.39; 244/53 B
See application file for complete search history.

(56) References Cited

U.S. PATENT DOCUMENTS

| | | |
|---|---|---|
| 2,948,111 A | 5/1955 | Nelson |
| 2,915,262 A | 12/1959 | Klein |
| 3,059,878 A | 10/1962 | Kerry et al. |
| 3,074,232 A | 1/1963 | Soyer |
| 3,119,581 A | 1/1964 | Trevaskis |
| 3,222,863 A | 12/1965 | Klees et al. |
| 3,298,637 A | 1/1967 | Lee |
| 3,422,624 A | 1/1969 | Brooks et al. |
| 3,524,611 A | 8/1970 | Frank |
| 3,532,100 A | 10/1970 | Hilton |
| 3,541,794 A | 11/1970 | Johnston et al. |
| 3,568,694 A | 3/1971 | Johnson |
| 3,575,259 A | 4/1971 | Wilkinson |
| 3,583,417 A | 6/1971 | Clark |
| 3,611,724 A | 10/1971 | Kutney |
| 3,618,699 A | 11/1971 | Evans |
| 3,623,328 A | 11/1971 | Pike |
| 3,623,494 A | 11/1971 | Poucher |
| 3,652,036 A | 3/1972 | Sans et al. |
| 3,662,556 A | 5/1972 | Poucher et al. |
| 3,664,612 A | 5/1972 | Skidmore et al. |

(Continued)

FOREIGN PATENT DOCUMENTS

| | | |
|---|---|---|
| FR | 980347 | 12/1950 |
| GB | 1070458 | 6/1967 |

(Continued)

OTHER PUBLICATIONS

Extended European Search Report for Application No. EP 08 25 2429 dated Nov. 26, 2008.

(Continued)

*Primary Examiner* — Phutthiwat Wongwian
(74) *Attorney, Agent, or Firm* — Carlson, Gaskey & Olds

(57) ABSTRACT

A method of providing a slim-line nacelle for a gas turbine engine includes the steps of detecting a windmilling condition and increasing a discharge airflow area of a variable area fan nozzle in response to the detection of the windmilling condition.

15 Claims, 5 Drawing Sheets

(56) References Cited

U.S. PATENT DOCUMENTS

| | | | |
|---|---|---|---|
| 3,699,682 A | 10/1972 | Kleckner | |
| 3,716,209 A | 2/1973 | Pierce | |
| 3,736,750 A | 6/1973 | Britt | |
| 3,763,874 A | 10/1973 | Wilde et al. | |
| 3,770,228 A | 11/1973 | Traksel et al. | |
| 3,905,566 A | 9/1975 | Anderson | |
| 3,932,058 A * | 1/1976 | Harner et al. | 416/28 |
| 4,007,891 A | 2/1977 | Sorensen et al. | |
| 4,012,013 A | 3/1977 | Ball et al. | |
| 4,044,973 A | 8/1977 | Moorehead | |
| 4,068,469 A * | 1/1978 | Adamson | 60/204 |
| 4,083,181 A | 4/1978 | Adamson | |
| 4,132,240 A | 1/1979 | Frantz | |
| 4,147,029 A | 4/1979 | Sargisson | |
| 4,154,256 A | 5/1979 | Miller | |
| 4,199,295 A | 4/1980 | Raffy et al. | |
| 4,220,171 A | 9/1980 | Ruehr et al. | |
| 4,242,864 A * | 1/1981 | Cornett et al. | 60/226.1 |
| 4,351,502 A | 9/1982 | Statkus | |
| 4,475,702 A | 10/1984 | Cole | |
| 4,540,143 A | 9/1985 | Wang et al. | |
| 4,722,357 A | 2/1988 | Wynosky | |
| 4,738,416 A | 4/1988 | Birbragher | |
| 4,827,712 A | 5/1989 | Coplin | |
| 4,865,268 A | 9/1989 | Tracksdorf | |
| 4,899,958 A | 2/1990 | Horikawa | |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,014,933 A | 5/1991 | Harm et al. | |
| 5,058,617 A | 10/1991 | Stockman et al. | |
| 5,127,222 A | 7/1992 | Ream et al. | |
| 5,141,182 A | 8/1992 | Coffinberry | |
| 5,143,329 A | 9/1992 | Coffinberry | |
| 5,145,126 A | 9/1992 | Patilla | |
| 5,156,362 A | 10/1992 | Leon | |
| 5,177,957 A | 1/1993 | Grieb | |
| 5,261,227 A * | 11/1993 | Giffin, III | 60/226.1 |
| 5,284,012 A | 2/1994 | Laborie et al. | |
| 5,297,765 A | 3/1994 | Hughes et al. | |
| 5,351,476 A | 10/1994 | Laborie et al. | |
| 5,357,742 A | 10/1994 | Miller | |
| 5,361,828 A | 11/1994 | Lee et al. | |
| 5,447,283 A | 9/1995 | Tindell | |
| 5,568,724 A | 10/1996 | Lindner et al. | |
| 5,586,431 A | 12/1996 | Thonebe et al. | |
| 5,593,112 A | 1/1997 | Maier et al. | |
| 5,626,017 A | 5/1997 | Sattemayer | |
| 5,665,916 A * | 9/1997 | Puster et al. | 73/590 |
| 5,725,182 A | 3/1998 | Valleroy | |
| 5,727,380 A | 3/1998 | Lardy et al. | |
| 5,732,547 A | 3/1998 | Olsen et al. | |
| 5,743,488 A | 4/1998 | Rolston et al. | |
| 5,803,410 A | 9/1998 | Hwang | |
| 5,813,625 A | 9/1998 | Hassan et al. | |
| 5,841,079 A | 11/1998 | Parente | |
| 5,934,611 A | 8/1999 | Tindell et al. | |
| 5,971,328 A | 10/1999 | Kota | |
| 5,987,880 A | 11/1999 | Culbetson | |
| 6,055,805 A | 5/2000 | El-Aini et al. | |
| 6,089,505 A | 7/2000 | Gruensfelder et al. | |
| 6,109,566 A | 8/2000 | Miller et al. | |
| 6,129,309 A | 10/2000 | Smith et al. | |
| 6,129,311 A | 10/2000 | Welch et al. | |
| 6,170,253 B1 | 1/2001 | Newton | |
| 6,179,251 B1 | 1/2001 | Tindell et al. | |
| 6,231,006 B1 | 5/2001 | Gruensfelder et al. | |
| 6,259,976 B1 | 7/2001 | Lemelson et al. | |
| 6,260,567 B1 | 7/2001 | Gruensfelder et al. | |
| 6,334,753 B1 | 1/2002 | Tillman et al. | |
| 6,340,135 B1 | 1/2002 | Barton | |
| 6,360,989 B1 | 3/2002 | Maguire | |
| 6,375,118 B1 | 4/2002 | Kibens et al. | |
| 6,379,110 B1 | 4/2002 | McCormick et al. | |
| 6,390,418 B1 | 5/2002 | McCormick et al. | |
| 6,471,477 B2 | 10/2002 | Hassan et al. | |
| 6,651,929 B2 | 11/2003 | Dionne | |
| 6,655,632 B1 | 12/2003 | Gupta et al. | |
| 6,698,691 B2 | 3/2004 | Porte | |
| 6,708,711 B2 | 3/2004 | Surply et al. | |
| 6,763,651 B2 | 7/2004 | Shmilovich et al. | |
| 6,764,043 B2 | 7/2004 | Sankrithi et al. | |
| 6,793,177 B2 | 9/2004 | Bonutti | |
| 6,971,229 B2 | 12/2005 | Lair | |
| 7,048,229 B2 | 5/2006 | Sanders et al. | |
| 7,048,230 B2 | 5/2006 | Meyer | |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,255,309 B2 | 8/2007 | Boldrin et al. | |
| 7,384,016 B2 | 6/2008 | Kota et al. | |
| 7,617,670 B2 | 11/2009 | Traux et al. | |
| 7,735,601 B1 | 6/2010 | Stieger et al. | |
| 7,739,865 B2 | 6/2010 | Prasad et al. | |
| 7,766,280 B2 | 8/2010 | Cloft et al. | |
| 7,802,760 B2 | 9/2010 | Webster | |
| 7,870,721 B2 | 1/2011 | Winter et al. | |
| 2004/0037162 A1 | 2/2004 | Flohr et al. | |
| 2004/0237534 A1 | 12/2004 | Webster et al. | |
| 2005/0060982 A1 | 3/2005 | Mani et al. | |
| 2005/0274103 A1 | 12/2005 | Prasad et al. | |
| 2006/0155432 A1 | 7/2006 | Brown | |
| 2007/0221788 A1 | 9/2007 | Meister | |
| 2008/0092548 A1 | 4/2008 | Morford et al. | |
| 2008/0112799 A1 | 5/2008 | Winter et al. | |
| 2008/0267762 A1 | 10/2008 | Jain et al. | |
| 2008/0283676 A1 | 11/2008 | Jain et al. | |
| 2008/0286094 A1 | 11/2008 | Jain | |
| 2009/0003997 A1 | 1/2009 | Jain et al. | |
| 2009/0008508 A1 | 1/2009 | Jain et al. | |
| 2009/0121083 A1 | 5/2009 | Jain | |

FOREIGN PATENT DOCUMENTS

| | | |
|---|---|---|
| GB | 1312619 | 4/1973 |
| GB | 1336724 | 11/1973 |
| GB | 1382809 | 2/1975 |

OTHER PUBLICATIONS

Extended European Search Report for Application No. EP 07 25 4305 dated Aug. 19, 2011.

Extended European Search Report for Application No. EP 08 25 1047 dated Sep. 6, 2011.

Extended European Search Report for Application No. EP 08 25 2263 dated Aug. 19, 2011.

Extended European Search Report for EP 08 25 3874 dated Jan. 25, 2012.

* cited by examiner

GAS TURBINE ENGINE HAVING SLIM-LINE NACELLE

CROSS REFERENCE TO RELATED APPLICATIONS

This application is a divisional application of U.S. patent application Ser. No. 11/584,030, which was filed on Oct. 20, 2006 now U.S. Pat. No. 7,797,944.

BACKGROUND

This disclosure generally relates to a gas turbine engine, and more particularly to a nacelle for a turbofan gas turbine engine.

In an aircraft gas turbine engine, such as a turbofan engine, air is pressurized in a compressor and mixed with fuel in a combustor for generating hot combustion gases. The hot combustion gases flow downstream through turbine stages that extract energy from the gases. In a two spool gas turbine engine, a high pressure turbine powers the high pressure compressor, while a low pressure turbine powers a fan disposed upstream of the compressor and a low pressure compressor.

Combustion gases are discharged from the turbofan engine through a core exhaust nozzle, and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust provided from the combustion gases is discharged through the core exhaust nozzle.

In high bypass turbofans a majority of the air pressurized by the fan bypasses the turbofan engine for generating propulsion thrust. High bypass turbofans typically use large diameter fans to achieve adequate turbofan engine efficiency. Therefore, the nacelle of the turbofan engine must be large enough to support the large diameter fan of the turbofan engine. The relatively large size of the nacelle results in increased weight and drag that may offset the propulsive efficiency achieved by high bypass turbofan engines.

SUMMARY

A method of providing a slim-line nacelle for a gas turbine engine includes the steps of detecting a windmilling condition and increasing a discharge airflow area of a variable area fan nozzle in response to the detection of the windmilling condition.

The various features and advantages of this disclosure will become apparent to those skilled in the art from the following detailed description. The drawings that accompany the detailed description can be briefly described as follows.

DETAILED DESCRIPTION

Figure 1:
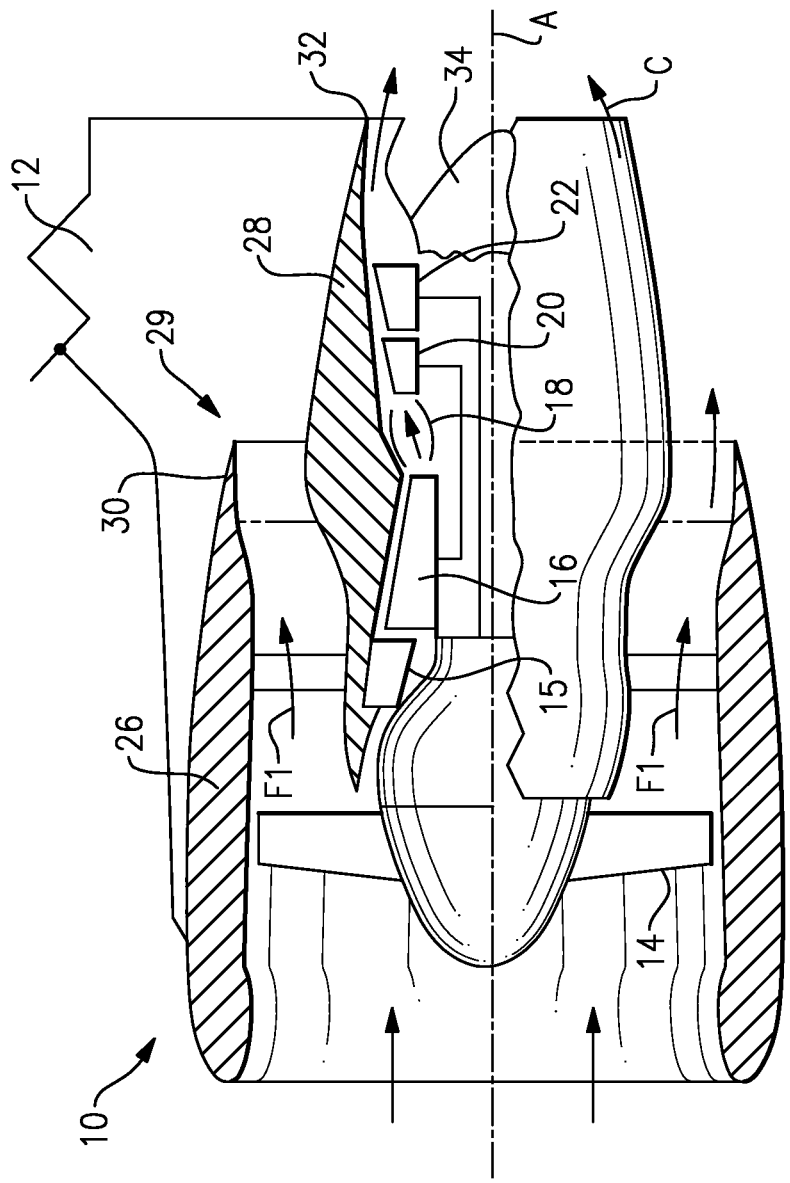
FIG. 1 illustrates a general perspective view of a gas turbine engine.

Referring to FIG. 1, a gas turbine engine 10 typically includes (in serial flow communication) a fan 14, a low pressure compressor 15, a high pressure compressor 16, a combustor 18, a high pressure turbine 20 and a low pressure turbine 22. During operation, air is pressurized in the compressors 15, 16 and mixed with fuel in the combustor 18 for generating hot combustion gases. The hot combustion gases flow through the high and low pressure turbines 20, 22 which extract energy from the hot combustion gases. The high pressure turbine 20 powers the high pressure compressor 16 through a shaft defined therebetween, and the low pressure turbine 22 powers the fan 14 and the low pressure compressor 15 through another shaft defined therebetween. The disclosure is not limited to the two spool axial gas turbine architecture described and may be used with other architectures, such as a single spool axial design, a three spool axial design and other architectures.

The gas turbine engine 10 is in the form of a high bypass ratio turbofan engine mounted within a nacelle assembly 26, in which most of the air pressurized by the fan 14 bypasses the core engine itself for the generation of propulsion thrust. The nacelle assembly 26 includes a fan cowl 46 and a core cowl 28 within the fan cowl 46. Fan discharge airflow F1 is discharged from the engine 10 through a variable area fan nozzle (VAFN) 30 defined radially between the core cowl 28 and the fan cowl 46. Core exhaust gases C are discharged from the core engine through a core exhaust nozzle 32 defined between the core cowl 28 and a center plug 34 disposed coaxially therein around a longitudinal centerline axis A of the gas turbine engine 10.

The VAFN 30 concentrically surrounds the core cowl 28 near an aftmost segment 29 of the nacelle assembly 26. The VAFN 30 of the nacelle assembly 26 defines a fan-nozzle discharge airflow area 36 (FIG. 2) between the fan cowl 46 and the core cowl 28 for axially discharging the fan discharge airflow F1 pressurized by the upstream fan 14.

Figure 2:
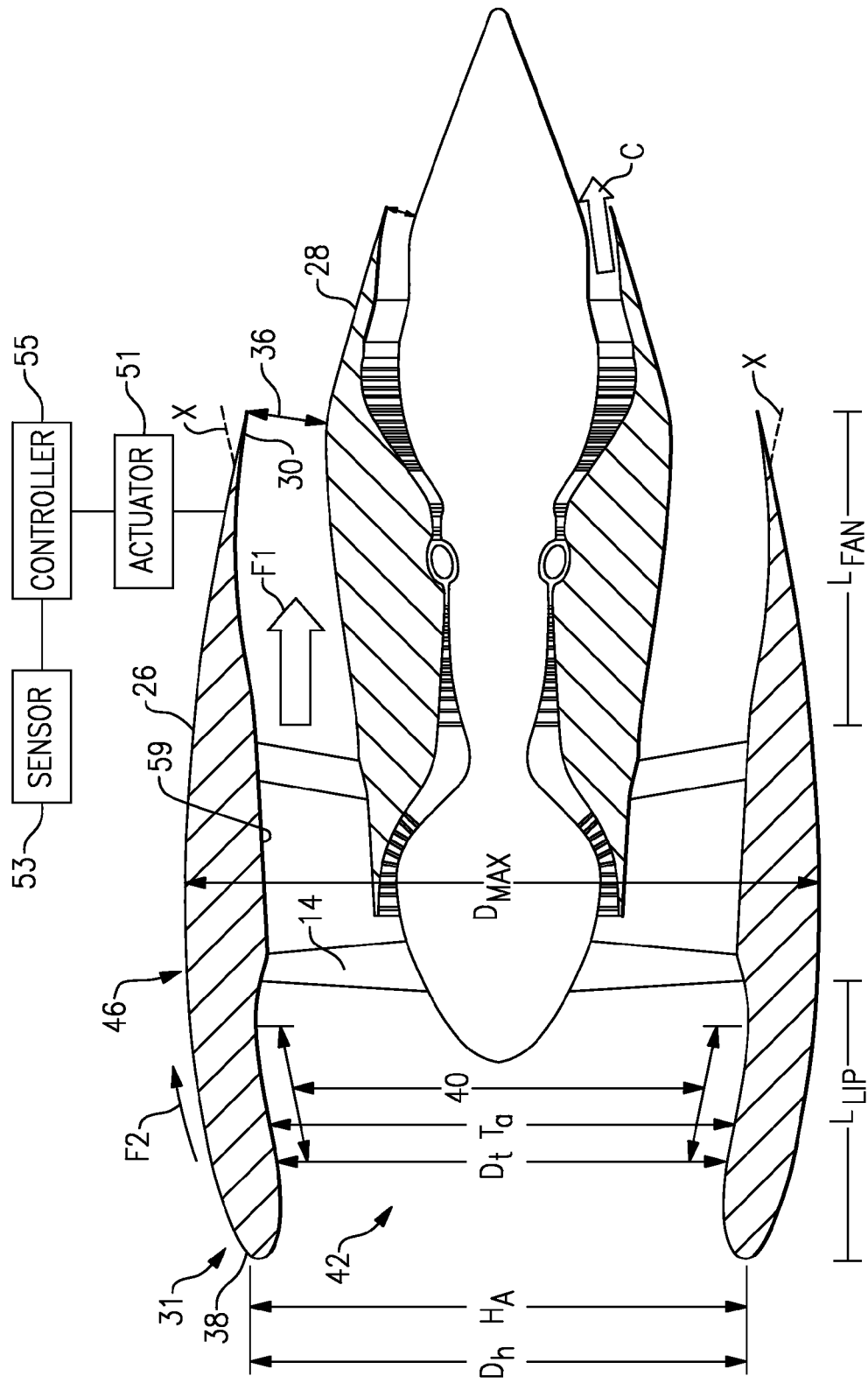
FIG. 2 is a schematic view of a gas turbine engine having a variable area fan nozzle (VAFN)

Referring to FIG. 2, the nacelle assembly 26 defines an inlet lip section 38 and an inlet internal diffuser section 40. The inlet lip section 38 is positioned near a forward segment 31 of the fan cowl 46. The inlet internal diffuser section 40 is defined between a throat 42 of the fan cowl 46 and a forward face of the fan 14. The fan cowl 46 defines an outer surface of the nacelle assembly 26. The nacelle assembly 26 also defines a highlight diameter $D_h$ and a maximum diameter $D_{max}$. The highlight diameter $D_h$ represents the diameter defined by the inlet lip section 38 of the nacelle assembly 26. The maximum diameter $D_{max}$ represents the peak diameter of the nacelle assembly 26. The throat 42 of the nacelle assembly 26 also defines a throat diameter $D_t$.

The maximum diameter $D_{max}$ of the nacelle assembly 26 may be established by Extended-Range Twin-Engine Operational Performance Standards (ETOPS) requirements, in which an external airflow F2 over the fan cowl 46 is required to remain separation free under an engine-out windmilling condition or other condition. ETOPS requirements are aircraft performance standards established by the International Civil Aviation Organization. It is desirable from an engine efficiency standpoint for the external airflow F2 to maintain attached to the fan cowl 46 during aircraft operation. A windmilling condition occurs where an engine of a twin-engine aircraft loses functionality (i.e. engine out condition). The damaged engine is advantageously permitted to rotate, and is driven by an airflow resulting from the forward velocity of the aircraft (i.e., the damaged engine is permitted to "windmill").

A diameter ratio, or the ratio of the highlight diameter $D_h$ to the maximum diameter $D_{max}$, is utilized to determine whether the nacelle assembly 26 achieves this ETOPS requirement and maintains an external airflow F2 which is separation free from the fan cowl 46. Current industry standards typically use a diameter ratio of at least approximately 0.80 to achieve a separation free airflow, but other diameter ratios may be feasible.

The nacelle assembly 26 also defines a contraction ratio. The contraction ratio represents a relative thickness of the inlet lip section 38 of the nacelle assembly 26 and is represented by the ratio of a highlight area $H_a$ (ring-shaped area defined by highlight diameter $D_h$) and a throat area $T_a$ (ring-shaped area defined by throat diameter $D_t$) of the nacelle assembly 26. Current industry standards typically use a contraction ratio of approximately 1.300 to prevent the separation of the fan discharge airflow F1 from an interior wall 59 of the fan cowl 46, but other contraction ratios may be feasible. "Thick" inlet lip section designs, which are associated with large contraction ratios, increase the maximum diameter and increase the weight and the drag penalties associated with the nacelle assembly 26. The nacelle assembly 26 further defines an inlet lip length $L_{lip}$ and a fan duct length $L_{fan}$.

Increasing the fan discharge airflow F1 during specific flight conditions allows the external airflow F2 to remain separation free from the fan cowl 46 while achieving a slim-line nacelle design. In one example, the increased fan discharge airflow F1 is achieved by providing the gas turbine engine 10 with a VAFN 30 and increasing the discharge airflow area 36 of the VAFN 30 during the specific flight conditions.

Figure 3:
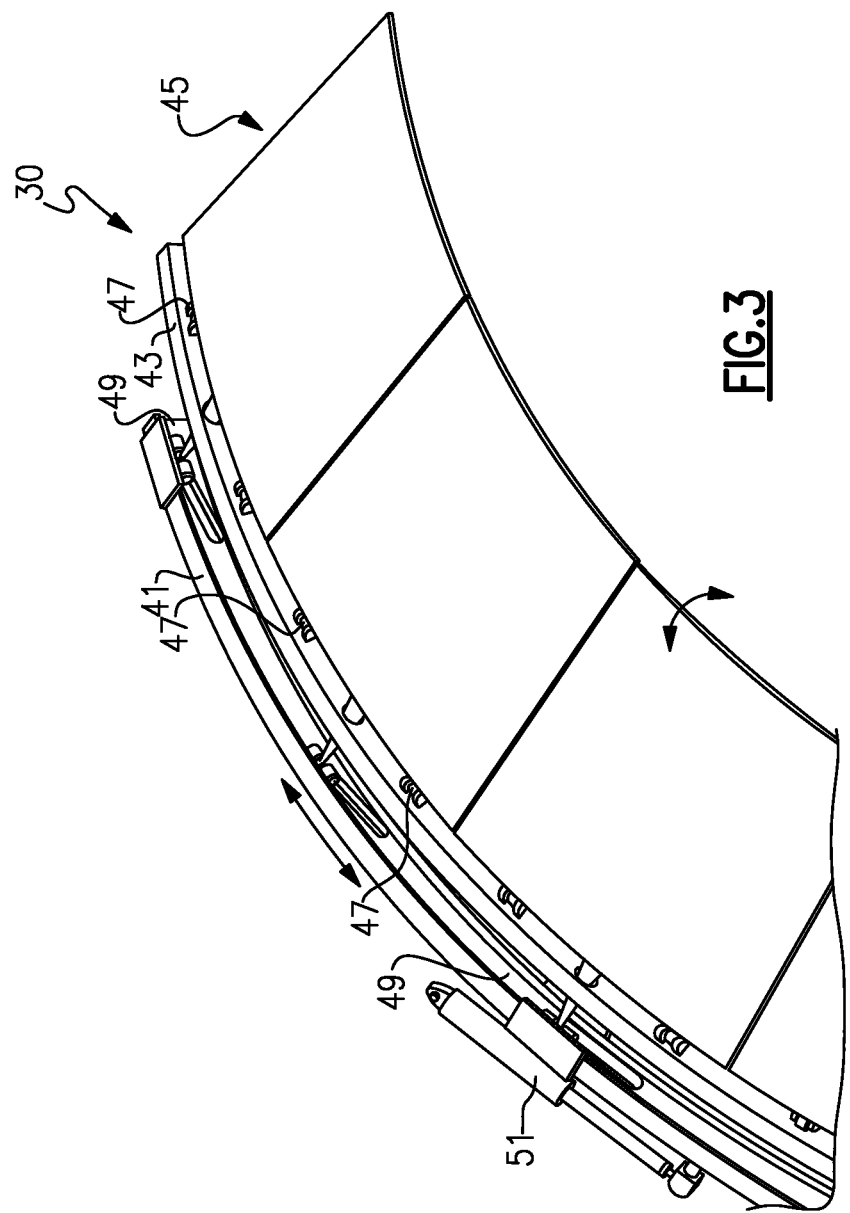
FIG. 3 is a perspective view of a section of the VAFN.

In one example, the increase in the discharge airflow area 36 is achieved by opening the VAFN 30. For example, the VAFN 30 generally includes a synchronizing ring 41, a static ring 43, and a flap assembly 45 (See FIG. 3). Other VAFN designs and actuation mechanisms may be used. The flap assembly 45 is pivotally mounted to the static ring 43 at a multitude of hinges 47 and linked to the synchronizing ring 41 through a linkage 49. An actuator assembly 51 (only one shown in FIG. 3) selectively rotates the synchronizing ring 41 relative the static ring 43 to adjust the flap assembly 45 through the linkage 49. The radial movement of the synchronizing ring 41 is converted to tangential movement of the flap assembly 45 to vary the discharge airflow area 36 defined by the VAFN 30 through which the fan discharge airflow F1 is discharged.

The increase in the discharge airflow area 36 is achieved by moving the VAFN 30 from a first position to a second (or open) position X (represented by dashed lines in FIG. 2) in response to a detected windmilling condition. The discharge airflow area 36 of the second position is greater than the discharge airflow area 36 of the first position. A sensor 53 detects the windmilling condition and communicates with a controller 55 to move the VAFN 30 via the actuator assembly 51. It should be understood that the sensor 53 and the controller 55 may be programmed to detect any known flight condition. In one example, the second position X represents moving the VAFN 30 to approximately 20% of its opening capability during the windmilling condition, although the actual percentage the VAFN 30 is opened will depend on design specific parameters of the gas turbine engine. A person of ordinary skill in the art would know how to design appropriate actuation and control systems to achieve comparable results with an alternative VAFN design. In another example, the increased fan discharge airflow F1 is achieved by providing the gas turbine engine with a variable pitch fan blade.

The opening of the VAFN 30 during windmilling conditions allows for a reduction in the maximum diameter $D_{max}$ of the nacelle assembly 26 while maintaining an external airflow F2 which is separation free from the fan cowl 46. Therefore, the nacelle assembly 26 achieves an improved (i.e. larger) diameter ratio. Further, the improved diameter ratio results in a weight savings and a reduction in nacelle drag (i.e., slim-line nacelle). The VAFN 30 is returned to its first position (represented by solid lines) during normal cruise operation of the aircraft.

Figure 4:
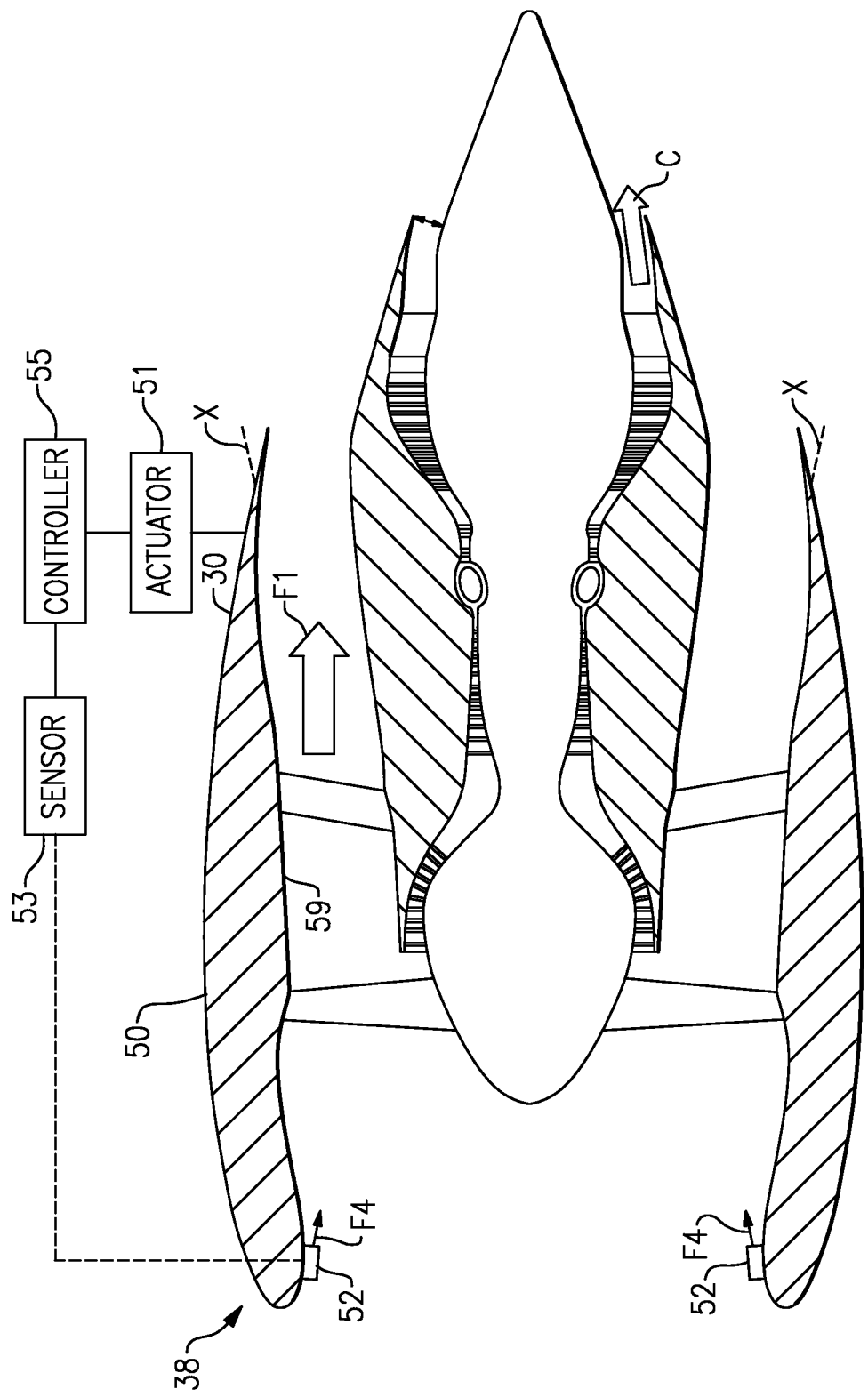
FIG. 4 illustrates a gas turbine engine having a VAFN and a first boundary layer control device.

Referring to FIG. 4, a slim-line nacelle 50 is illustrated which includes a first boundary layer control device 52 in addition to the VAFN 30. The slim line nacelle 50 offers additional nacelle drag and weight benefits over the nacelle assembly 26. The first boundary layer control device 52 is positioned at the inlet lip section 38 of the slim line nacelle 50. The first boundary layer control device 52 introduces an airflow F4 near the inlet lip section 38 in a direction defined by an intake airflow F3 prior to the onset of separation of the fan discharge airflow F1 from the interior wall 59 of the slim line nacelle 50. The first boundary layer control device 52 addresses any distortion associated with the fan discharge airflow F1 as the fan discharge airflow F1 is communicated from an upstream end of the engine 10 toward the downstream end.

The first boundary layer control device 52 may introduce the airflow F4 by injection or suction of airflow near the inlet lip section 38. For example, fluid injection jet devices (for injection of airflow) or blowing slots (for suction of airflow) may be provided near the inlet lip section 38 to introduce the airflow F4. It should be understood that the nacelle may include any known boundary layer control technology.

The first boundary layer control device 52 is actuated to generate the airflow F4 in response to detection of at least one operability condition. The operability condition is detected by the sensor 53. The sensor 53 communicates the detection of the operability condition to the controller 55, which then actuates the first boundary layer control device 52 to generate the airflow F4. A person of ordinary skill in the art would understand how to program the sensor 53 and the controller 55 for performing these functions.

In one example, the operability condition includes a static condition. Static conditions occur at low speeds (i.e., just prior to take-off). In another example, the operability condition includes a cross-wind condition. Cross-wind conditions are experienced during takeoff as the aircraft travels down the runway (i.e., where the aircraft experiences airflow in a roughly perpendicular direction with respect to the movement of the aircraft down the runway). In yet another example, the operability condition includes a high angle of attack condition. High angle of attack conditions are experienced where the aircraft is traveling at low speeds and the angle of incidence of the airflow relative to the inlet lip section 38 of the slim line nacelle 50 is relatively large. It should be understood that first boundary layer control device 52 may be controlled during any operability condition experienced by an aircraft during operation.

In addition, the discharge airflow area 36 of the VAFN 30 may be increased simultaneously with the generation of the airflow F4 by the first boundary layer control device 52 during the operability conditions to achieve further weight and drag reductions. In one example, both the VAFN 30 and the boundary layer control device 52 are utilized during all static conditions, cross-wind conditions, and high angle of attack conditions. The controller 55 is programmable to move the VAFN 30 to a position representing approximately 10% of its opening capability during cross-wind conditions and high angle of attack conditions, and to approximately 20% of its opening capability during static conditions. The first boundary layer control device 52 is turned off during windmilling conditions and during normal cruise operation of the aircraft to achieve optimal performance.

The first boundary layer control device 52 and the VAFN 30 may be utilized simultaneously during the operability conditions to achieve a nacelle having a reduced contraction ratio while maintaining non-separation of the fan discharge airflow F1 from the interior wall 59 of the slim line nacelle 50. Therefore, corresponding weight and drag benefits are achieved by the slim-line nacelle 50.

Figure 5:
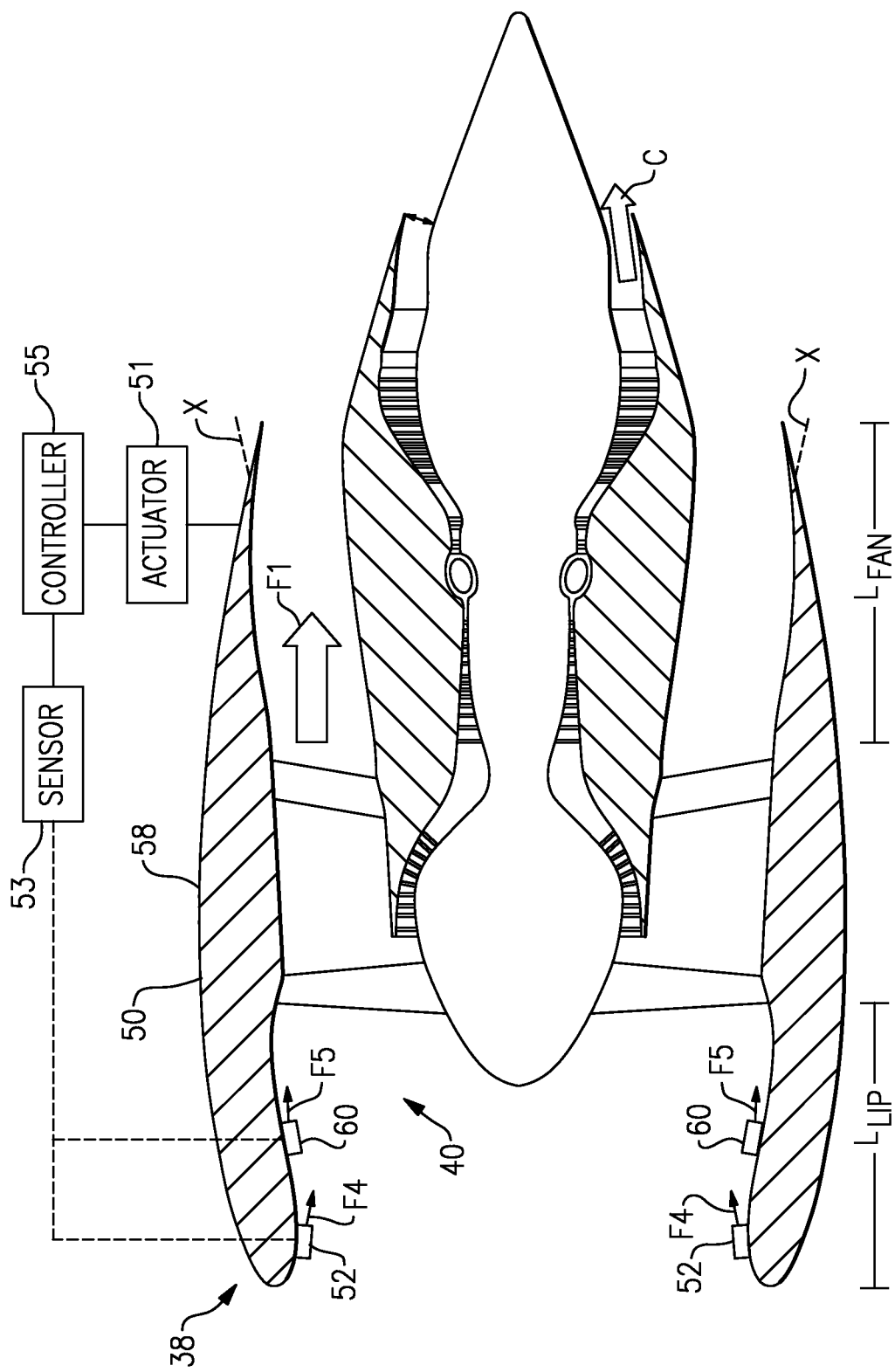
FIG. 5 illustrates a gas turbine engine having a VAFN, a first boundary layer control device and a second boundary layer control device for achieving a slim line nacelle.

Referring to FIG. 5, a second slim-line nacelle 58 is illustrated. The nacelle 58 includes a second boundary layer control device 60 in addition to the first boundary layer control device 52 and the VAFN 30. The second boundary layer control device 60 is identical to the configuration of the first boundary layer control device 52 except that the second boundary layer control device 60 is positioned downstream from the first boundary layer control device and near the inlet internal diffuser section 40. The second boundary layer control device 60 generates an airflow F5 at the inlet internal diffuser section 40 to prevent separation of the fan discharge airflow F1 from the interior wall 59 near this area of the nacelle 58.

The second boundary layer control device 60 is actuated by the controller 55 in response to detection of at least one operability condition. In one example, the second boundary layer control device 60 is utilized to generate the airflow F5 during static conditions, cross-wind conditions, and high angle of attack conditions. Utilization of the second boundary layer control device 60 at the inlet internal diffuser section 40 of the nacelle 58 enables a reduction in the inlet lip length $L_{lip}$ and the fan duct length $L_{fan}$, thereby enabling a weight reduction in the nacelle design. The second boundary layer control device 60 is shut off during windmilling conditions and during normal cruise operation of the aircraft.

In one example, the VAFN 30, the first boundary layer control device 52, and the second boundary layer control device 60 are exploited simultaneously during at least one of the operability conditions. In another example, the VAFN 30, the first boundary layer control device 52 and the second boundary layer control device 60 are simultaneously utilized during all static conditions, cross-wind conditions and high angle of attack conditions which are detected by the sensor 53. The slim-line nacelle 58 achieves further drag reduction benefits in response to the simultaneous utilization of all three technologies during diverse flight requirements.

The foregoing description shall be interpreted as illustrative and not in any limiting sense. A worker of ordinary skill in the art would recognize that certain modifications would come within the scope of this disclosure. For that reason, the following claims should be studied to determine the true scope and content of this disclosure.

What is claimed is:

1. A method of achieving a slim-line nacelle on a gas turbine engine, comprising the steps of:
    (a) sensing a windmilling condition; and
    (b) increasing a discharge airflow area of a variable area fan nozzle in response to the windmilling condition from the sensing step.

2. The method as recited in claim 1, wherein the windmilling condition comprises an engine out condition during flight subsequent to take-off.

3. The method as recited in claim 1, wherein the variable area fan nozzle is moveable between a first position having a first discharge airflow area and a second position having a second discharge airflow area greater than the first discharge airflow area, wherein said step (b) comprises:
    moving the variable area fan nozzle from the first position to the second position in response to sensing the windmilling condition.

4. The method as recited in claim 3, further comprising the step of:
    (c) returning the variable area fan nozzle to the first position during a cruise operation.

5. The method as recited in claim 1, wherein the step of sensing includes:
    sensing the windmilling condition with a sensor; and
    communicating a signal to a controller for responding to the windmilling condition.

6. The method as recited in claim 5, wherein responding to the windmilling condition includes commanding the variable area fan nozzle to move between a first position and a second position in response to the signal.

7. The method as recited in claim 1, wherein the step of increasing includes rotating a synchronizing ring relative to a static ring to adjust a flap assembly of the variable area fan nozzle between a first position and a second position.

8. The method as recited in claim 1, wherein the step of increasing includes moving the variable area fan nozzle to at least 20% of its opening capability.

9. The method as recited in claim 1, comprising the step of:
    injecting an airflow near an inlet lip section of the gas turbine engine.

10. The method as recited in claim 9, wherein the step of increasing and the step of injecting are performed simultaneously.

11. The method as recited in claim 1, comprising the step of:
    suctioning an airflow near an inlet lip section of the gas turbine engine.

12. The method as recited in claim 11, wherein the step of increasing and the step of suctioning are performed simultaneously.

13. The method as recited in claim 1, comprising the steps of:
    positioning a first boundary layer control device at an inlet lip section of the gas turbine engine; and
    positioning a second boundary layer control device downstream from the first boundary layer control device.

14. The method as recited in claim 13, comprising actuating at least one of the first boundary layer control device and the second boundary layer control device in response to an operability condition that is different from the windmilling condition.

15. A method of achieving a slim-line nacelle on a gas turbine engine, comprising the steps of:
    sensing an operability condition;
    increasing a discharge airflow area of a variable area fan nozzle; and introducing an airflow near an inlet lip section of the gas turbine engine, wherein the steps of increasing and introducing are performed in response to the operability condition from the sensing step to achieve the slim-line nacelle.

* * * * *